United States Patent
Yue et al.

(10) Patent No.: US 12,484,826 B2
(45) Date of Patent: Dec. 2, 2025

(54) LOW-POWER CONTACTLESS PHYSIOLOGICAL SENSOR

(71) Applicant: University of the West of England, Bristol, Bristol (GB)

(72) Inventors: Xicai Yue, Bristol (GB); David Attwood, Bristol (GB); Janice Kiely, Bristol (GB)

(73) Assignee: University of the West of England, Bristol, Bristol (GB)

( * ) Notice: Subject to any disclaimer, the term of this patent is extended or adjusted under 35 U.S.C. 154(b) by 777 days.

(21) Appl. No.: 17/787,143

(22) PCT Filed: Dec. 18, 2020

(86) PCT No.: PCT/GB2020/053268
§ 371 (c)(1),
(2) Date: Jun. 17, 2022

(87) PCT Pub. No.: WO2021/123794
PCT Pub. Date: Jun. 24, 2021

(65) Prior Publication Data
US 2023/0027668 A1     Jan. 26, 2023

(30) Foreign Application Priority Data

Dec. 19, 2019 (GB) .................. 1918862

(51) Int. Cl.
*A61B 5/277* (2021.01)
*A61B 5/00* (2006.01)
(Continued)

(52) U.S. Cl.
CPC .............. *A61B 5/277* (2021.01); *A61B 5/302* (2021.01); *A61B 5/7207* (2013.01);
(Continued)

(58) Field of Classification Search
CPC ......... A61B 5/277; A61B 5/282; A61B 5/305; A61B 5/7207; A61B 2562/0209; A61B 2562/0214
See application file for complete search history.

(56) References Cited

U.S. PATENT DOCUMENTS

| | | | |
|---|---|---|---|
| 6,807,438 | B1 | 10/2004 | Brun Del Re et al. |
| 2014/0200469 | A1 | 7/2014 | Bocko et al. |

(Continued)

FOREIGN PATENT DOCUMENTS

| | | |
|---|---|---|
| CA | 2438683 A1 | 8/2002 |
| CN | 1192352 A | 9/1998 |

(Continued)

OTHER PUBLICATIONS

Combined Search and Examination Report for GB Application No. GB1918862.2 dated Feb. 14, 2020, 3 pages.

(Continued)

*Primary Examiner* — Eun Hwa Kim
(74) *Attorney, Agent, or Firm* — Wood IP Law, LLC; Theodore A. Wood

(57) ABSTRACT

A system-on-chip contactless physiological sensor (10) is provided which comprises a capacitive-sensor electrode (14) having a first capacitance (C1) and an amplifier device (18) connected to the capacitive-sensor electrode (14), the capacitive-sensor electrode (14) and amplifier device (18) at least in part forming an amplifier circuit for the physiological sensor (10). An artefact-reducing capacitor (20) is then connected in series between the capacitive-sensor electrode (14) and an input of the amplifier device (18), the artefact-reducing capacitor (20) having a second capacitance (C2) which is less than the first capacitance (C1). In this sensor (Continued)

Figure 1:
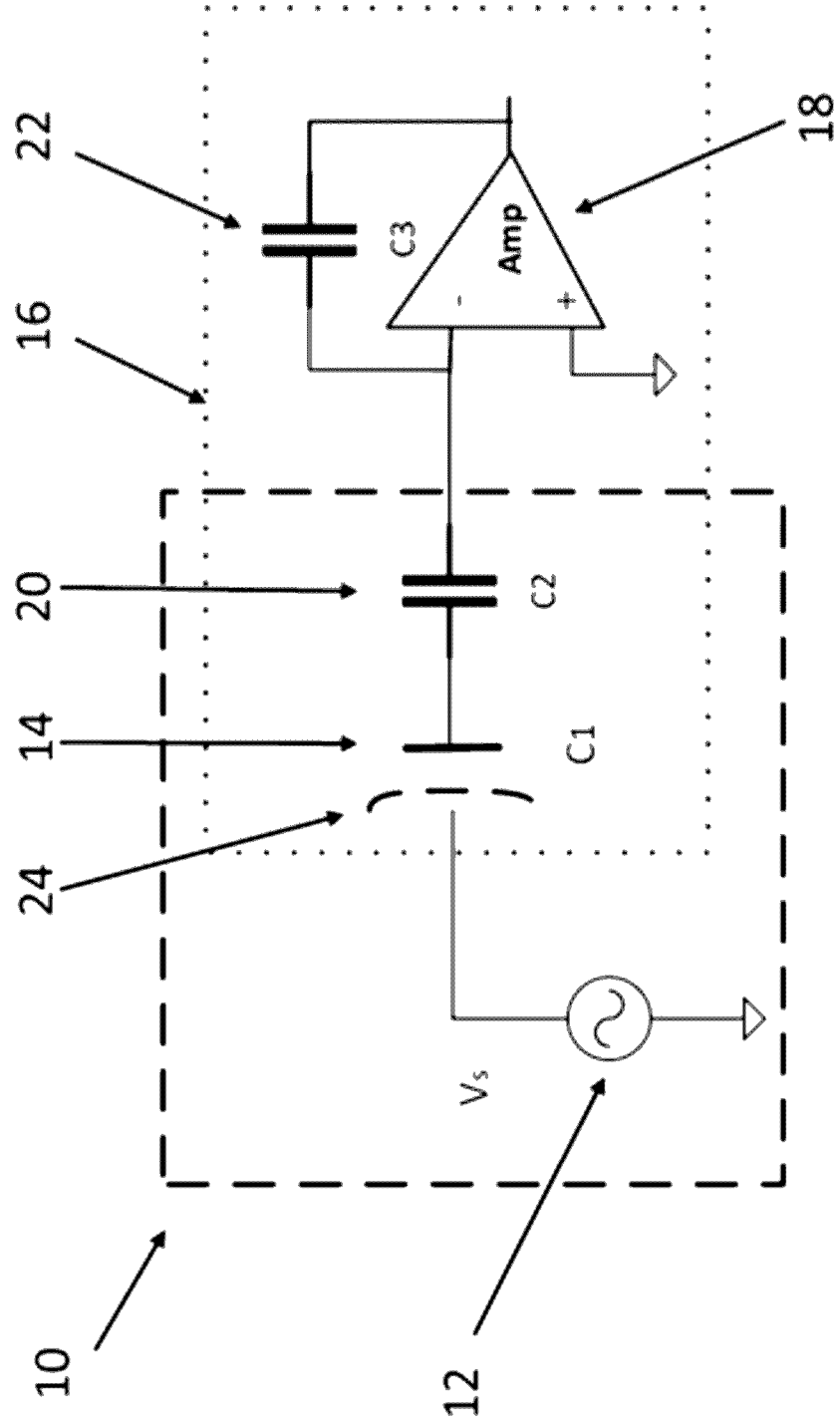

(10), there is no impedance boosting input between the capacitive-sensor electrode (14) and the input of the amplifier device (18).

14 Claims, 2 Drawing Sheets

(51) Int. Cl.
*A61B 5/302* (2021.01)
*G01D 5/24* (2006.01)

(52) U.S. Cl.
CPC .......... *G01D 5/2405* (2013.01); *A61B 5/6801* (2013.01); *A61B 2560/0209* (2013.01); *A61B 2562/0214* (2013.01)

(56) References Cited

U.S. PATENT DOCUMENTS

| | | | |
|---|---|---|---|
| 2017/0033292 | A1 | 2/2017 | Park et al. |
| 2018/0000415 | A1* | 1/2018 | Gupta ............... A61B 5/684 |
| 2018/0115320 | A1 | 4/2018 | Sharma et al. |
| 2022/0202336 | A1* | 6/2022 | Lowe ................ A61B 5/053 |

FOREIGN PATENT DOCUMENTS

| | | |
|---|---|---|
| CN | 105286855 A | 2/2016 |
| CN | 105286855 B | 2/2018 |
| CN | 108975266 A | 12/2018 |
| KR | 20100107101 A | 10/2010 |
| RU | 2010131390 A | 2/2012 |
| TW | 200913961 A | 4/2009 |
| TW | I359652 B | 3/2012 |
| TW | 201316950 A | 5/2013 |
| TW | 201642807 A | 12/2016 |
| WO | 2011104398 A1 | 9/2011 |

OTHER PUBLICATIONS

International Search Report and the Written Opinion for International Application No. PCT/GB2020/053268 mailed Mar. 24, 2021, 10 pages.

Odilon De Oliveira Dutra et al. "Low power noise bio-amplifier with adjustable gain for digital bio-signals acquisition systems," Circuits and Systems (LASCAS), 2013 IEEE Fourth Latin American Symposium ON, IEEE, Feb. 27, 2013 (Feb. 27, 2013), pp. 1-4, XP032409846, DOI: 10.1109/LASCAS.2013.6518985, ISBN: 978-1-4673-4897-3.

* cited by examiner

LOW-POWER CONTACTLESS PHYSIOLOGICAL SENSOR

The present invention relates to a low-power contactless physiological sensor, particularly but not necessarily exclusively for use as part of an electrocardiogram or similar medical sensor device. The invention further relates to any of a personal fitness device, a medical monitoring device, and a gaze-tracking device. A method of improving the motion-insensitivity of a contactless electrode of a physiological sensor is also provided.

The typical electrical model of an electrocardiogram (ECG) electrode has parallel resistive and capacitive branches. For wet electrodes, the resistive component is dominant, of the order of less than 1 kΩ, whereas for contactless or dry electrodes, the impendence rises to of the order of 1 GΩ, and the capacitive component dominates. In such dry electrode arrangements, extra circuits are required to boost the input impedance of the amplifier, to form a low output impedance active electrode.

Impedance boosting of the amplifier is power consuming. The sole commercially available active contactless electrode chip at the time of writing is the EPIC chip. This arrangement uses active feedback techniques to lower the effective input capacitance of the sensing element and boost the input resistance. However, the power consumption of this chip is of the order of 10 mW, which renders it unsuitable for long-term use.

Motion-induced impedance change, that is, the motion enlarged distance from sensing electrode to skin resulting in electrode impedance increasing, puts an even greater strain on impedance boosting circuits. As such, motion artefacts are a significant issue for contactless electrodes.

Existing artefact-reducing methods either focus on lower skin-electrode impedance variation during motion, for example by providing better grip onto the skin using an invasive microneedle array, or by acquiring the dynamic change in impedance during motion to compensate for the signal in real-time.

These issues reduce the utility of existing electrodes for novel applications. For example, high power consumption and severe motion artefacts prevent existing sensors from being used for wearable or home healthcare applications. Wet electrodes, that is, those which rely on some sort of liquid or gel-based contact medium with the skin, are uncomfortable and can cause skin irritation, which prevents them from being utilised for long durations.

The present invention seeks to provide a physiological sensor which is small, low-power, and insensitive to motion artefacts which would otherwise inhibit the efficacy of a contactless sensor.

According to a first aspect of the invention, there is provided a system-on-chip contactless physiological sensor comprising: a capacitive-sensor electrode having a first capacitance; an amplifier device connected to the capacitive-sensor electrode, the capacitive-sensor electrode and amplifier device at least in part forming an amplifier circuit for the physiological sensor; and an artefact-reducing capacitor connected in series between the capacitive-sensor electrode and an input of the amplifier device, the artefact-reducing capacitor having a second capacitance which is less than the first capacitance, wherein there is no impedance boosting input between the capacitive-sensor electrode and the input of the amplifier device.

The present invention overcomes the issue of the generation of noise within a dry or contactless physiological sensor which can result when there are significant changes in impedance at the electrode. In particular, such changes are caused by motion which alters the distance between the source, that is, the user, and the electrode. The solution is the provision of a serially-connected artefact-reducing capacitor which has a much lower capacitance than that anticipated at the electrode. This ensures that the gain variation at the amplifier device is minimised, as large impedance fluctuations are neutralised by the presence of the smaller artefact-reducing capacitor. This has the additional advantage of reducing the power consumption of the sensor when compared with equivalent devices which need an impedance boosting circuit to be additionally provided, allowing the entire sensor to be provided as a system-on-chip.

Impedance boosting circuits utilise a large amount of power, and therefore the elimination of such a circuit from a physiological sensor will allow for a much more long-lasting device to be produced, as well as also allowing for miniaturisation to be effective.

Optionally, the amplifier circuit may be devoid of a bootstrap amplifier circuit.

The positioning of the artefact-reducing capacitor as part of the amplifier circuit allows for the elimination of any additional circuits which could otherwise be detrimental to the power consumption of the physiological sensor.

Optionally, the second capacitance may be less than 10 pF.

The scale of the second capacitance is set to be considerably smaller than the expected measurable capacitance at the capacitive-sensor electrode, and a capacitance of the order of picofarads is well within the suitable range.

In one preferable embodiment, the second capacitance may be at least 50 times less than the first capacitance. Furthermore, the second capacitance may be at least 100 times less than the first capacitance.

In order for the noise generated particularly by motion artefacts to be compensated for by the artefact-reducing capacitor, it needs to be significantly smaller than the capacitance created when the capacitive-sensor electrode contacts the user's skin.

The capacitive-sensor electrode may have a sensor area of less than 30 mm$^2$. More preferably, the capacitive-sensor electrode may have a sensor area of or substantially of 15 mm$^2$.

The advantage of the present invention in reducing the power consumption of the physiological sensor has the added benefit of allowing for miniaturisation of the capacitive-sensor electrode, and therefore the sensor area can be much reduced. This allows for the production of far less intrusive devices than would otherwise be possible with a contactless electrode arrangement.

Preferably, the physiological sensor may be an ECG, EEG, EoG, or EMG sensor.

Many existing physiological sensors already available could utilise the circuit architecture of the present invention to improve power consumption and noise issues.

The physiological sensor may have a power consumption of less than 1 mW, or more preferably may have a power consumption of less than 100 μW.

Low power consumption is one of the main advantages of the present invention, which allows the physiological sensor to be utilised for a long period of time without additional power requirements. This makes the sensor suitable for many applications where the power consumption of existing contactless electrodes has been prohibitive.

The amplifier device may be an op-amp.

An operational amplifier or op-amp is a voltage amplifying device which is high-gain, and therefore is highly suitable for use within the present circuit arrangement.

The equivalent capacitance is determined by the formula:

$$C' = \frac{C2}{1 + C2/C1}$$

where C1 is the first capacitance and C2 is the second capacitance.

Since the equivalent capacitance tends towards the second capacitance where the second capacitance is much smaller than the first capacitance, this has the effect of masking any noise issues associated with particularly motion artefacts of the physiological sensor.

The low-power physiological sensor may further comprise a bridging capacitor which spans the amplifier device, and which has a third capacitance. Preferably, the second capacitance may be less than the third capacitance.

In one preferable embodiment, the gain of the amplifier device may be determined by the formula:

$$\text{gain} = \frac{C1\,C2}{\frac{(C1+C2)}{C3}} = \frac{1 + \frac{C1}{C1}}{C3} \cong \frac{C2}{C3}$$

where C1 is the first capacitance, C2 is the second capacitance, and C3 is the capacitance of the bridging capacitor.

The bridging capacitor may be useful in determining the gain of the amplifier device and should be larger than the artefact-reducing capacitor to be effective.

According to a second aspect of the invention, there is provided a personal fitness device comprising a system-on-chip contactless physiological sensor in accordance with the first aspect of the invention.

The physiological sensor integrated into a personal fitness device will be able to compensate for the high incidence of artefact generation which will be caused by the user's sweat, as well as due to the significant degree of motion created during exercise. The artefact-reducing capacitor circumvents these issues. Furthermore, the low-power nature of the sensor significantly increases the utility of the personal fitness device during endurance events.

According to a third aspect of the invention, there is provided a medical monitoring device comprising a system-on-chip contactless physiological sensor in accordance with the first aspect of the invention.

Since the present sensor is a low-power device, it can be utilised in much longer-term applications than might otherwise be possible with existing sensors. For example, this may improve the detection of cardiovascular occurrences which might be quite rare in a 24-hour period, but which could be otherwise indicative of heart disease or imminent heart failure. It might also permit long-term monitoring of vulnerable and/or house-bound individuals by health professionals.

According to a fourth aspect of the invention, there is provided a gaze-tracking device comprising a system-on-chip contactless physiological sensor in accordance with the first aspect of the invention.

Gaze-tracking technology could utilise the present sensor to improve, for example, control mechanisms for less able-bodied individuals. For example, this could open up possibilities for wheelchair control without utilising the expensive gaze-tracking camera systems currently available on the market. Furthermore, such a gaze-tracking device could be used to reduce lag times in virtual reality control applications, which may find widespread using in the video gaming industry. This would likely improve the issues many users have with experiencing nausea and/or fainting due to the variable reaction delay which has been experienced with camera-based virtual reality gaze trackers.

According to a fifth aspect of the invention, there is provided a method of improving the motion-insensitivity of a contactless electrode of a physiological sensor, the method comprising the step of: introducing an artefact-reducing capacitor connected in series between the electrode and an input of an amplifier device associated therewith to at least in part form an amplifier circuit for the physiological sensor as part of a system-on-chip, wherein there is no impedance boosting input between the contactless electrode and the input of the amplifier device, and wherein a capacitance of the artefact-reducing capacitor is less than that of the contactless electrode.

Further according to the invention, there is provided a low-power system-on-chip physiological sensor comprising an on-chip metal pad configured to act as a capacitive-sensor electrode, an AC-coupled neural amplifier connected to the on-chip metal pad, wherein a chosen capacitance of the AC-coupled neural amplifier is less than a sensing capacitance of the capacitive-sensor electrode.

This arrangement serves to make the sensor insensitive to motion artefacts. The sensing capacitor acts as a coupling capacitor of the amplifier, and therefore the motion-incurred capacitance change will not affect the gain of the amplifier.

According to a further aspect of the invention, there is provided a low-power physiological sensor comprising: a capacitive-sensor electrode having a first capacitance; an amplifier device connected to the capacitive-sensor electrode, the capacitive-sensor electrode and amplifier device at least in part forming an amplifier circuit for the physiological sensor; and an artefact-reducing capacitor connected in series between the capacitive-sensor electrode and the amplifier device, the artefact-reducing capacitor having a second capacitance which is less than the first capacitance.

Figure 2:
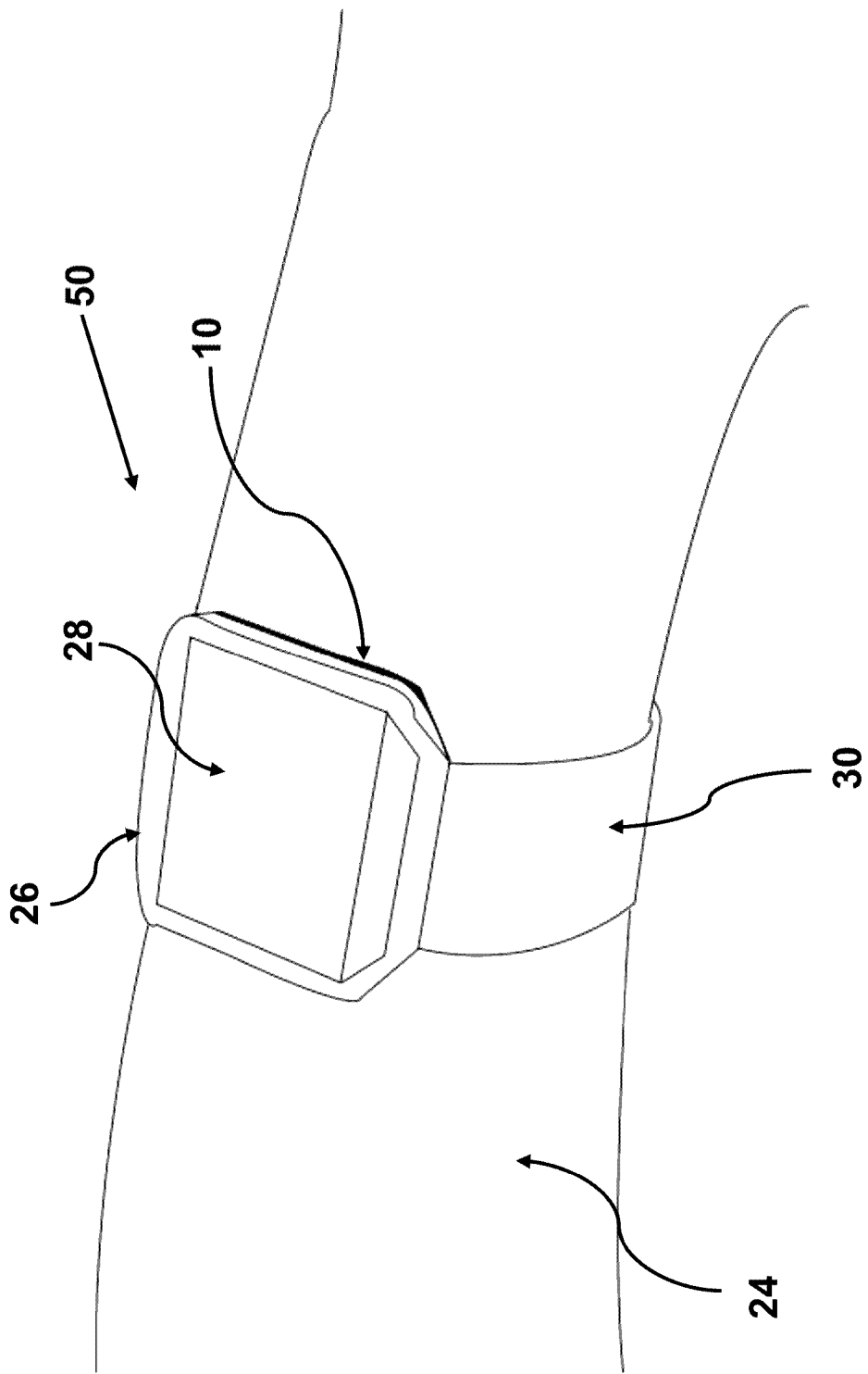

The invention will now be more particularly described, by way of example only, with reference to the accompanying drawings, in which:

FIG. 1 shows a diagrammatic representation of a first embodiment of a low-power physiological sensor in accordance with the first aspect of the invention; and FIG. 2 shows a perspective representation of a user's arm wearing one embodiment of a personal fitness device in accordance with the second aspect of the invention.

Referring to FIG. 1, there is indicated an indicative arrangement of a physiological sensor, referenced globally at 10, in which the source 12 of the capacitive-sensing circuit is a physiological source of a user, such as the skin or body.

The physiological sensor 10 of the present embodiment is a dry, or contactless, sensor, in the sense that no conductive medium is required such as gel or liquid, as is the case for wet, or contact, sensors.

A capacitive-sensor electrode 14 is provided as part of the physiological sensor 10, which is placed in close proximity with the user's skin so as to be able to detect signals therefrom. This will typically be provided as a conductive, preferably metal, plate positioned on a skin-facing surface of a device including the physiological sensor 10.

The topology of the capacitive-sensor electrode 14 is preferably that of a neural amplifier circuit, and as such, when the capacitive-sensor electrode 14 is designed in a complementary metal-oxide-semiconductor (CMOS) process, µW level power consumption can be achieved, which is several orders of magnitude lower than state of the art contactless solutions based on impedance boosting.

In a traditional dry sensor, the capacitive-sensor electrode would be coupled to a separate bootstrap amplifier, and would be dynamic so as to attempt to compensate for any noise generated by the change of impedance. The present invention obviates this issue.

Rather than providing a bootstrap amplifier as a separate component, it is instead proposed that the physiological sensor 10 be visualised as having an amplifier circuit 16 which includes the capacitive-sensor electrode 14, in conjunction with an amplifier device 18 such as an op-amp. Preferably, the amplifier device forms an AC-coupled neural amplifier, and could also be defined as a capacitive-feedback amplifier device. This effectively makes for a zero-impedance voltage source.

In doing this, no impedance boosting circuit is required, ensuring that the simplest circuit and lowest power consumption can be achieved. Furthermore, parasitic capacitance between the capacitive-sensor electrode 14 and the amplifier device 18 can be eliminated, allowing for the miniaturization of the sensing pad, consequently resulting in a smaller electrode than could otherwise be utilised.

The difficulty is then in coping with motion or other unexpected changes in the skin condition, such as the presence of moisture such as sweat. Here, a further modification is made to the amplifier circuit 16 of inserting an artefact-reducing capacitor 20 in series between the capacitive-sensor electrode 14 and the amplifier device 18.

The capacitive-sensor electrode 14 has a first capacitance $C1$, which may be a maximum possible capacitance when the capacitive-sensor electrode 14 is in contact with a user's skin. Changes to the distance between the skin and the capacitive-sensor electrode 14, for example, may alter the first capacitance $C1$.

The artefact-reducing capacitor 20 has a second capacitance $C2$, and the equivalent capacitance $C'$ therefore available to the amplifier device 18 for detection of the signal can be expressed according to the following formula.

$$C' = \frac{C2}{1 + C2/C1}$$

It will therefore be apparent that where the second capacitance $C2$ is significantly smaller than the first capacitance $C1$, the equivalent capacitance $C'$ will tend towards the second capacitance $C2$.

The gain of the amplifier device 18 can then be expressed as $-C'/C3$, where $C3$ is the third capacitance $C3$ of a bridging capacitor 22 across the amplifier device 18. The gain variation caused by motion artefacts is therefore expressed as $\Delta C'/C3$. This gain variation is minimised due to the tending of the equivalent capacitance $C'$ towards the second capacitance $C2$. For example, where the first capacitance $C1$ by, for example, a doubling of the distance between the capacitance-sensor electrode 14 and the user's skin would result in a gain variation of less than 1%. The presence of the artefact-reducing capacitor 20 profoundly negates the effect of motion artefacts on the detectable signal at the amplifier device 18.

Indeed, the gain of the amplifier device can be expressed by the formula:

$$\text{gain} = \frac{C1\,C2}{\frac{(C1+C2)}{C3}} = \frac{1 + \frac{C2}{C1}}{C3} \cong \frac{C2}{C3}$$

where $C1$ is the first capacitance, $C2$ is the second capacitance, and $C3$ is the capacitance of the bridging capacitor.

Unlike in existing contactless electrode circuits where the interfacing between the ultra-high impedance capacitive sensor and amplification circuit is required for effective sensing, the amplifier circuit 16 of the present physiological sensor 10 integrates the sensing capacitor comprising the capacitive-sensing electrode 14 with the amplifier device 18 to form a system-on-chip (SoC) solution in which the capacitive-sensing electrode 14 also acts as part of the amplifier. No interface is required to boost the input impedance of the amplifier device 18 much higher than the already ultra-high impedance of the capacitive-sensing electrode 14 is required, and all components can therefore be provided as a single integrated circuit. Consequently, the circuit of the present invention can entirely eliminate the impedance boosting circuit, resulting in a simplified circuit structure with significantly reduced power consumption compared with system-on-chip arrangements in other fields.

The solution of the present invention therefore has a reduced voltage requirement, typically being of the order of 1.2 to 1.5V, and can utilise a much smaller surface area for the capacitive-sensing electrode 14, for example, less than 30 mm$^2$, more preferably less than 15 mm$^2$, and potentially being of the order of 1 mm$^2$. The power consumption will then be less than 100 µW.

A further advantage of the amplifier circuit 16 configuration is that the amplifier device 18 is partially protected from electrostatic discharge (ESD), and therefore only protection at the output pin needs to be considered. This further reduces the potential for noise signal coupled from the high impedance input pins of the amplifier device 18.

There are many potential advantages to the present circuit arrangement. Physiological measurements such as electrocardiograms (ECG), electroencephalograms (EEG), electrooculograms (EoG), electromyograms (EMG) could be performed using a medical monitoring device incorporating a physiological sensor 10 as previously described. Such measurements could be performed with dry electrodes in hospitals, clinics, general practice surgeries, and with the reduced capacitive-sensing electrode 14 size, being gel-free, and easy placement on the body, would be significantly simpler to administer and potentially for a much longer period of time. This would allow for more long-term measurements to be taken.

For ECG measurements, for instance, the above-described technology, when utilised in conjunction with wireless power transfer means, could allow for real-time continuous ECG transmission within a flexible time period to be conducted, as opposed to presently available 30-day event-active ECG monitors, or the 1 to 2 year battery lifespan which is associated with an implantable event recorder. This improvement would allow for early detection of infrequently-occurring cardiac events, such as culprit arrhythmia which may not occur during a standard 24-hour period. This would the allow for the evaluation of patient outcomes not otherwise possible, and may potentially permit prediction and prevention of cardiac events such as heart attacks or recurring strokes.

Another main application of the physiological sensor 10 may be in neonatal ECG monitoring on delivery room resuscitation to replace pulse oximetry. This would allow for more rapid and accurate identification of the neonatal heart rate. Furthermore, the long-term applications of the physiological sensor might allow for neonatal monitoring to identify cardiovascular issues during early life, which might otherwise not be possible where there are strict application guidelines for electrodes when used on sensitive new-born skin.

The use of the physiological sensor 10 in an EoG context may allow for the provision of a new human-computer interface, which, for example, could provide affordable wheelchair control. Existing camera-based systems are very expensive, and the cost of the present sensing arrangement could be several orders of magnitude cheaper. This might then allow more users to take advantage of such technological advances. In particular, the use of the physiological sensor 10 as part of a gaze-tracking device to achieve this end.

A gaze-tracking device having such a physiological sensor 10 may also be useful in non-medical contexts. An EoG sensor has a very fast response time, of the order of 1 ms, and therefore a gaze-tracking device may result in a superior sensor for virtual reality (VR) technology applications, particularly in the video gaming industry, where existing gaze-tracking cameras, operating at 25 fps introduce lag. This delay, of up to around 40 ms currently puts many people off VR applications.

Such gaze-tracking technology could also be extended in or in conjunction with head-up displays to users, and therefore may find particularly utility in aviation contexts.

Another use of the physiological sensor 10, and as illustrated in FIG. 2, is in the context of a personal fitness device 50, which may be provided as a wearable device which the user can attach to themselves, for example, on their arm 24. Here, the personal fitness device is provided as a watch-like device, having a primary housing 26 for the physiological sensor 10, which may include some form of display 28 capable of outputting measurement information to the user, and may have a mounting element, such as a strap 30.

The present physiological sensor 10 has a much-improved capacity for use in sporting contexts, where there will otherwise be very significant motion artefacts, as well as sweat-related discrepancies in the measurements. The low power of the physiological sensor 10 also makes it more appropriate for use in endurance sports, such as distance running, cycling, and triathlon events. The long-term low-power capabilities may also make this an appropriate sensor for integration into spacesuits for astronauts for continuous monitoring of their physiological parameters in a power-restricted environment.

Other possible applications for the physiological sensor 10 include rapid drug and explosives detection from a police dog viewpoint, for example, or for fast response in rescue missions. The sensors could also be used to assess fatigue, which might improve safety in road vehicles, as well as for general studies of human behaviour in psychological, medical, marketing, engineering or educational contexts.

It is therefore possible to integrate an artefact-reducing capacitor in series as part of an amplifier circuit for a physiological sensor, in which the capacitive-sensor electrode and amplifier device are both part of the amplifier circuit, thereby obviating the need for a separate impedance boosting circuit. The artefact-reducing capacitor reduces the noise generated primarily by motion for a contactless electrode, which in turn results in significant reductions to power consumption and electrode size. A miniaturised device can therefore be created.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A system-on-chip contactless physiological sensor comprising:
   a capacitive-sensor electrode having a first capacitance;
   an amplifier device connected to the capacitive-sensor electrode, the amplifier device having an inverting input and non-inverting input, the capacitive-sensor electrode and the amplifier device at least in part forming an amplifier circuit for the physiological sensor which has a gain determined by the values of a second capacitance of an artefact-reducing capacitor and a third capacitance of a bridging capacitor which spans the amplifier device between the inverting input and an output of the amplifier device; and
   the artefact-reducing capacitor being connected in series between the capacitive-sensor electrode and the inverting input of the amplifier device;
   wherein the second capacitance is less than the first capacitance;
   wherein there is no impedance boosting input between the capacitive-sensor electrode and the inverting input of the amplifier device, and wherein the gain of the amplifier device is determined by the formula:

$$\text{gain} = \frac{\frac{C1\,C2}{(C1+C2)}}{C3} = \frac{1+\frac{C2}{C1}}{C3} \cong \frac{C2}{C3}$$

where C1 is the first capacitance, C2 is the second capacitance, and C3 is the capacitance of the bridging capacitor.

2. The system-on-chip contactless physiological sensor as claimed in claim 1, wherein the amplifier device is devoid of a bootstrap amplifier circuit.

3. The system-on-chip contactless physiological sensor as claimed in claim 1, wherein the second capacitance is less than 10 pF.

4. The system-on-chip contactless physiological sensor as claimed in claim 1, wherein the second capacitance is at least 50 times less than the first capacitance.

5. The system-on-chip contactless physiological sensor as claimed in claim 4, wherein the second capacitance is at least 100 times less than the first capacitance.

6. The system-on-chip contactless physiological sensor as claimed in claim 1, wherein the capacitive-sensor electrode has a sensor area of less than 30 mm².

7. The system-on-chip contactless physiological sensor as claimed in claim 6, wherein the capacitive-sensor electrode has a sensor area of or substantially of 15 mm².

8. The system-on-chip contactless physiological sensor as claimed in claim 1, wherein the system-on-chip contactless physiological sensor is an electrocardiogram (ECG), electroencephalogram (EEG), electrooculogram (EoG), or electromyogram (EMG) sensor.

9. The system-on-chip contactless physiological sensor as claimed claim 1, wherein the system-on-chip contactless physiological sensor has a power consumption of less than 1 mW.

10. The system-on-chip contactless physiological sensor as claimed in claim 9, wherein the system-on-chip contactless physiological sensor has a power consumption of less than 100 μW.

11. The system-on-chip contactless physiological sensor as claimed in claim 1, wherein the amplifier device is an op-amp.

12. The system-on-chip contactless physiological sensor as claimed in claim 1, wherein the equivalent capacitance is determined by the formula:

$$C' = \frac{C2}{1 + C2/C1}$$

where C1 is the first capacitance and C2 is the second capacitance.

13. The system-on-chip contactless physiological sensor as claimed in claim 1, wherein the second capacitance is less than the third capacitance.

14. A personal fitness device, a medical monitoring device or a gaze-tracking device comprising a system-on-chip contactless physiological sensor as claimed in-claim 1.

* * * * *